United States Patent Office 2,824,037
Patented Feb. 18, 1958

2,824,037
METHOD OF MAKING AN ADHESIVE AND METHOD OF MAKING A PAPER PRODUCT

Henry Dudley King, Chicago, Ill.

No Drawing. Application September 15, 1954
Serial No. 456,331

7 Claims. (Cl. 154—138)

This invention relates to a method of making a laminated paper product, and to a method of preparing a potentially adhesive material usable in said method.

One of the objects of this invention is to provide an improved method of making a laminated paper product comprising preparing an aqueous flowable starch medium containing ungelatinized starch granules, treating the granules with a starch splitting material while heating to a temperature sufficiently to partially gelatinize the starch granules and increase the viscosity of said medium, stopping said treatment while said medium is flowable, applying said medium to the paper laminates, pressing said laminates into intimate contact to form an assembly, and heating the assembly to further gelatinize the starch, thereby rapidly increasing the viscosity of said medium and causing the laminates to adhere together.

Another object of the invention is to provide such a method wherein the initial heating is to an initial thickening temperature for the starch medium and wherein the starch splitting material is an enzyme.

Yet another object of the invention is to provide an improved method of making a laminated corrugated paper product comprising preparing an aqueous flowable starch medium containing at least about 4% by weight of starch together with water in a ratio of about 3 parts by weight of water to 1 to 2 parts of starch, adding a small amount of starch splitting enzyme, heating to an initial thickening temperature at which the viscosity is substantially increased, inactivating the enzyme while the starch medium is still flowable, applying said medium to the paper laminates, pressing said laminates into intimate contact to form an assembly, and heating the assembly to further gelatinize the starch, thereby rapidly increasing the viscosity of said medium and causing the laminates to adhere together.

Another object of the invention is to provide an improved method of preparing a potentially adhesive material capable of being made adhesive by heating, comprising preparing an aqueous flowable starch medium containing ungelatinized starch granules, treating the granules with a starch splitting material while heating to a temperature sufficient to partially gelatinize the starch granules and increase the viscosity of said medium, and stopping said treatment while said medium is flowable.

Yet another object of the invention is to provide an improved method of preparing a potentially adhesive material capable of being made adhesive by heating, comprising preparing an aqueous flowable starch medium containing at least about 4% by weight of starch together with water in a ratio of about 3 parts by weight of water to 1 to 2 parts of starch, adding a small amount of a starch splitting enzyme, heating to an initial thickening temperature at which the viscosity is substantially increased, and inactivating the enzyme while the starch medium is flowable.

Further objects and advantages of the invention will be apparent from the following description of the invention.

One of the principal commercial methods of making laminated paper products, and particularly corrugated boards, is a method which involves preparing a potentially adhesive composition that is usable as a bonding agent between the paper laminates. This composition is made adhesive by heating and comprises a composition including ungelatinized starch suspended in a flowable liquid carrier including water and gelatinized starch. In this process, the potentially adhesive composition which is flowable and capable of adhering to the sheets of paper laminates may be used with an ordinary corrugating machine of the type shown diagrammatically in Bauer Patents 2,051,025 and 2,102,937. The composition is applied by rollers from a glue pan to the paper sheets before they are pressed together, and the sheets are then firmly pressed into contact with each other and the entire assembly heated to gelatinize the starch granules under the influence of the heat. The composition contains water and starch and may contain any of the ordinary modifying agents such as inert filler materials which may include clay, yellow ochre, powdered talc, chalk and the like. The laminating machine is of the ordinary type and the potentially adhesive composition is applied in the ordinary manner, the principal differences being in the adhesive composition.

While the above described prior potentially adhesive composition results in a strong laminated paper product, it does have many disadvantages. One of the major disadvantages is the fact that the mixture of gelatinized starch and ungelatinized starch granules tends to gelatinize the starch granules before the composition is applied to the paper. Thus, one of the chief difficulties in such paper making processes using this prior art composition is that the composition often forms solid "dough" balls on the rollers, in the glue pan, on the strippers or crescents or guide fingers thereby tending to cause dry streaks, as well as in the glue pan itself, so that the entire machine must be stopped at frequent intervals in order to clean off these masses of solid or semisolid gelatinized starch.

Furthermore, with this prior art process it is necessary to raise the temperature of the laminated paper product over a large range in order to cause the starch granules to gelatinize. This means that rather extensive heating equipment must be provided in order to secure the desired temperature rise because the paper sheets travel through the machine at a very high speed. Thus in one example where the starch employed was cornstarch, the mixture of starch granules suspended in the gelatinized starch and water composition could not be heated to a temperature above 120 to 130° F. before being applied to the paper sheets and the sheets being pressed together to form the laminated product because of the danger of the ungelatinized starch becoming gelatinized prematurely before being applied to the paper sheets and before the sheets were pressed together. After the sheets had been pressed together it was necessary to raise the temperature to at least about 170 to 175° F. in order to complete the gelatinization. Thus, the temperature rise in the machine had to be from a temperature of 120 to 130° F. to a final temperature of 170 to 175° F.

In the present invention these disadvantages are avoided. The method of making a laminated paper product according to the present invention comprises preparing an aqueous flowable starch medium containing ungelatinized starch granules, then treating the granules in the medium with the starch gelatinizing material while heating to a temperature sufficient to partially gelatinize the starch granules and increase the viscosity of the medium, stopping the treatment while the medium is still flowable, applying the medium to the paper laminates, pressing the laminates into intimate contact to form an assembly and heating the assembly to further gelatinize the starch whereby the viscosity of the medium is rapidly increased and its adhesive character is increased to cause the laminates to adhere together.

The preferred gelatinizing material is a starch gelatinizing enzyme which operates to split the granules. The enzyme is added to the aqueous starch medium containing ungelatinized starch granules prior to substantial heating as the heat serves to activate the enzyme. With increasing temperature the enzyme becomes active until the medium has reached an initial thickening temperature. By using the enzyme, this initial thickening temperature is fairly close to the final thickening temperature. Thus in a specific example where the starch employed was cornstarch, the initial thickening temperature was 158 to 160° F. while the final thickening temperature at which substantially all the starch granules were split was only 172° F. Thus, it was necessary to raise the temperature of the laminated paper only from about 160° F. to about 172° F. to complete the rupture of the starch granules and make a completely adhesive material. This is in sharp contrast to the prior methods as explained above in which the temperature had to be raised from a low of about 120 to 130° F. to about 170 to 175° F. The heating is stopped at the point of initial thickening and the modification is continued until the desired viscosity, preferably as determined by trial on the machine, is achieved. When this viscosity is achieved the starch modification action of the enzyme or other agent is stopped. In the case of an enzyme, the action of the enzyme is halted by completely inactivating it by the addition of a salt of a heavy metal, a mixture of salts or some other suitable reagent. There are a large number of these salts and reagents that are usable and their use is well understood by those skilled in the art. Copper sulphate is a good example of an inactivating material.

Because the starch granule rupturing material is inactivated as soon as the starch containing medium is thickened by heating to a temperature close to the ultimate starch rupturing temperature, the disadvantage of the prior process in which the starch gelatinizes in the glue pan and on the glue rolls, necessitating stopping the equipment to clean it off, is avoided.

The present process does not require any complicated additional equipment or change of equipment in the laminating machine. In fact, the only change is in the adhesive composition itself so that this composition may be used in conventional paper laminating machines such as the corrugated board making machine illustrated diagrammatically in the above mentioned Bauer Patents 2,051,025 and 2,102,937.

The present process has a number of new and unobvious advantages over the prior processes. Thus, as has been mentioned, there is less danger of the starch gelatinizing in the machine before being applied to the paper so that the machine may be run for extremely long periods without having to be stopped for cleaning. Another advantage is that the composition must be raised in temperature only a very small amount to complete the gelatinization of the starch. Thus, as has been pointed out, in one instance the temperature only had to be raised from the initial thickening temperature of about 158 to 160° F. to the final gelatinizing temperature of about 170 to 175° F. Furthermore, the corrugating machine or other paper laminating machine may be operated at much greater speeds as it is not necessary to retain paper in the machine for relatively long periods to raise the temperature of the laminated paper. The present adhesive is also found to give greater stiffness and greater strength to the laminated product. Furthermore, the starch composition may be either acid, alkaline or neutral, and a wide variety of fillers may be employed if desired. Furthermore, any of the usual modifying materials such as waterproofing agents may be used to achieve specific desired results without interfering with the adhesive character of the gelatinized starch in the final product.

Although the preferred starch rupturing material is a starch splitting enzyme as has been discussed above, starch may also be modified by the use of acids. When acids are used, the action is stopped by adding an alkaline material. This may be any of the usual materials such as ammonia, borax, sodium or potassium hydroxide, triethanolamine and any of a vast number of similar materials.

In the preferred process the starch is modified by the action of the enzyme which is used in a very small amount. Thus, the amount of enzyme may vary between about 0.1 and 5%, based upon the dry weight of the starch, with about 0.5% being a satisfactory amount. The starch composition itself contains a minor proportion of starch, for example about 3 parts by weight of water to one to two parts by weight of starch. These are the preferred lower amounts of starch, as more starch may be used if desired. The amount of starch for any particular paper laminate is well understood by those skilled in the art. Thus, the amount of starch depends upon the apparatus and method of laminating, the kind of paper used, the speed of operation of the machine, the temperature characteristics of the machine and similar variables.

In practicing the invention, a mixture of starch, water and enzyme is preferably heated to a temperature where the viscosity of the composition is increased. This action of the enzymes on the starch is increased with increasing temperatures. The viscosity which is achieved again depends upon the variables in the machine, method and product. This viscosity, which may vary considerably, depends upon the type of apparatus, the kinds of paper, the speed at which the paper moves through the machine and the temperatures in the machine itself. As soon as the starch composition has reached a desired viscosity the enzyme is inactivated by adding an inactivating agent as mentioned above. Then any desired filler, resin, waterproofing agent, or the like, may be mixed in. The partially modified starch is then poured into the glue pan of the machine and the machine operated in the customary manner to form the laminated products. As has been pointed out, the composition of this invention and the method of this invention are particularly useful in making corrugated paper board.

The enzymes that are employed are preferably those that produce a minimum of sugars from starch and are known as amylolytic enzymes. However, other enzymes such as the saccharifying types may also be used. An example of this latter type is the diastatic malt enzyme.

In one method of practicing the invention, a starch composition was prepared containing three parts by weight of water and one part of cornstarch. To this composition was added 0.5% by weight of the dry starch of an amylolytic enzyme. The mixture was agitated and heated to a temperature of 155–158° F., when the mixture was found to begin to thicken. The heating was stopped at this point and the viscosity of the mixture was tested. The viscosity of the composition was determined by checking it with a Bauer viscosity funnel. This funnel is an empirical method of indicating relative viscosities and is widely used in the corrugated paper board art. The funnel includes a metal tube about 5⅞ inches long containing two marks spaced apart about 3¾ inches and 5½ inches from the bottom of the tube, with the volume between these marks being about 100 cc. The bottom of the tube is provided with an orificed plate having an orifice of the size such that it will pass 100 cc. of water in 15 seconds. The relative viscosity is determined by noting the time required to pass 100 cc. of the starch composition. In the preferred process, the viscosity of the activated starch is preferably such that it takes 100 cc. about 20–40 seconds to pass through the orificed plate.

In the above specific example, the starch composition was found to have a Bauer viscosity of about 25 seconds. As soon as this had been achieved, a small amount of copper sulphate was added to inactivate the enzyme. This was necessary in order to prevent further enzyme rupture of the starch granules. The amount of copper sulphate, which is an efficient yet inexpensive material, was about 10 grains per 100 pounds of the above starch and water composition.

As soon as the copper sulphate had been added and thoroughly mixed into the starch composition, the composition was then introduced into an ordinary corrugated paper board making machine. This starch composition which was at a temperature of about 160° F. when introduced into the machine was applied to the paper in the customary manner and the composite corrugated board was heated to complete the heat gelatinization of the starch. The temperature rise required is only about 10-15° although a greater temperature rise is not ordinarily detrimental. After the board had left the machine, it was found to be a strong, clean laminated product.

As has been pointed out above, enzymes are the preferred starch modifying material for use in this invention. However, an acid may also be used. When an acid is employed, the amount of acid may be very small. Thus, with a strong acid such as muriatic acid, the amount may be between 0.1 and 0.5%, based on the dry weight of the starch.

Having described my invention as related to the embodiment set out herein, it is my intention that the invention be not limited by any of the details of description unless otherwise specified, but rather be construed broadly within its spirit and scope as set out in the accompanying claims.

I claim:

1. The method of making a laminated paper product, comprising: preparing an aqueous flowable starch composition containing ungelatinized starch granules and a gelatinizing material; preliminarily heating said composition to an initial temperature sufficient to partially gelatinize and thicken said starch composition under the action of said starch gelatinizing material; adding to said thickened material while it is still flowable and without substantial cooling an inactivating agent for said starch gelatinizing material to stop substantially said gelatinizing by said starch gelatinizing material; then applying said heated thickened material to the paper laminates; substantially immediately pressing said laminates into intimate contact to form an assembly; and thereafter substantially immediately heating the assembly to a final starch gelatinizing temperature that is above said initial temperature to gelatinize the starch further toward complete gelatinization.

2. The method of claim 1 wherein said starch gelatinizing material is a starch splitting enzyme.

3. The method of claim 1 wherein said starch gelatinizing material is an acid.

4. The method of making a laminated paper product, comprising: preparing an aqueous flowable starch composition containing ungelatinized starch granules and a gelatinizing material; preliminarily heating said composition to an initial temperature sufficient to partially gelatinize and thicken said starch composition under the action of said starch gelatinizing material until the composition reaches a Bauer viscosity of about 20-40 seconds; adding to said thickened material while it is still flowable and without substantial cooling an inactivating agent for said starch gelatinizing material to stop substantially said gelatinizing by said starch gelatinizing material; then applying said heated thickened material to the paper laminates; substantially immediately pressing said laminates into intimate contact to form an assembly; and thereafter substantially immediately heating the assembly to a final starch gelatinizing temperature that is above said initial temperature to gelatinize the starch further toward complete gelatinization.

5. The method of claim 4 wherein said initial temperature is about 158-160° F. and said final temperature is about 170-175° F.

6. The method of making a laminated paper product, comprising: preparing an aqueous flowable starch composition containing at least about 4% by weight of starch, and water in a ratio of about 3 parts by weight of water to about 1 to about 2 parts by weight of starch and a gelatinizing material; preliminarily heating said composition to an initial temperature sufficient to partially gelatinize and thicken said starch composition under the action of said starch gelatinizing material until the composition reaches a Bauer viscosity of about 20-40 seconds; adding to said thickened material while it is still flowable and without substantial cooling an inactivating agent for said starch gelatinizing material to stop substantially said gelatinizing by said starch gelatinizing material; then applying said heated thickened material to the paper laminates; substantially immediately pressing said laminates into intimate contact to form an assembly; and thereafter substantially immediately heating the assembly to a final starch gelatinizing temperature that is above said initial temperature to gelatinize the starch further toward complete gelatinization.

7. The method of claim 5 wherein said initial temperature is about 158-160° F. and said final temperature is about 170-175° F.

References Cited in the file of this patent

UNITED STATES PATENTS

| | | |
|---|---|---|
| 1,257,307 | Bloede | Feb. 26, 1918 |
| 2,212,557 | Bauer | Aug. 27, 1940 |
| 2,258,741 | Champion | Oct. 14, 1941 |
| 2,372,666 | Fenn | Apr. 3, 1945 |
| 2,424,546 | Bauer et al. | July 29, 1947 |

OTHER REFERENCES

Serial No. 606,278, February 14, 1950, vol. 631, page 381 of the Official Gazette.